Feb. 11, 1964 T. J. DIETZ 3,121,069
COMPOSITION OF STYRENE-BUTADIENE COPOLYMER
AND POLYORGANOSILOXANE
Filed April 25, 1956
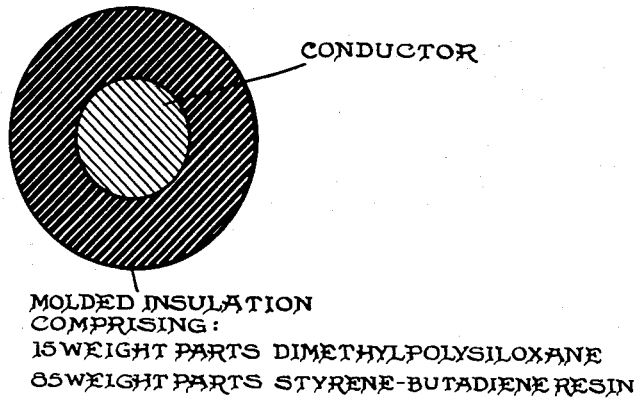
CONDUCTOR
MOLDED INSULATION
COMPRISING:
15 WEIGHT PARTS DIMETHYLPOLYSILOXANE
85 WEIGHT PARTS STYRENE-BUTADIENE RESIN
Inventor:
Thomas J. Dietz
By Leech & Radue
Attorneys

3,121,069
COMPOSITION OF STYRENE-BUTADIENE CO-
POLYMER AND POLYORGANOSILOXANE
Thomas J. Dietz, Chester Heights, Pa., assignor to Delaware Research & Development Corporation, Wilmington, Del., a corporation of Delaware
Filed Apr. 25, 1956, Ser. No. 580,542
2 Claims. (Cl. 260—45.5)

This invention relates to mechanical mixtures of polyorganosiloxanes and thermoplastic high polymers. It also relates to a blending process for attaining such mechanical mixtures. This application is a continuation-in-part of application Serial No. 417,699, filed March 22, 1954, and now abandoned.

More specifically this invention relates to moldable mixtures of normally incompatible polyorganosiloxanes and thermoplastic high polymers. In general the contemplated polyorganosiloxanes correspond to

where R and R' are the same or different halogenated or non-halogenated, alkyl, aralkyl, aroxyalkyl, aroxyaryl, or other (non-polymerizable) organic radical capable of direct union with the silicon atom.

In its preferred embodiment the present invention concerns a water repellent insulating composition comprising over 50% by weight of a styrene-containing thermoplastic high polymer and over about 15% by weight polyorganosiloxane taken from the group of dimethylpolysiloxane, methyl phenyl polysiloxane, ethyl phenyl polysiloxane, methyl chlorophenyl polysiloxane, di-trichlorophenyl polysiloxane, and di-phenoxyphenyl polysiloxane.

In another preferred embodiment the present invention concerns a water repellent composition comprising 97-99 parts by weight of a polystyrene thermoplastic high polymer from 1-3 parts by weight polyorganosiloxane selected from the group consisting of dimethylpolysiloxane, methyl phenyl polysiloxane, ethyl phenyl polysiloxane, methyl chlorophenyl polysiloxane, di-trichlorophenyl polysiloxane, and di-phenoxyphenyl polysiloxane. Desirably, pigments may be present.

The water repelling characteristics of the polyorganosiloxanes are well known, but for many reasons, notably expense, and the fact that commercially available silicone rubber does not have the mechanical properties required for rigid insulators, a water repellent molding composition should not consist solely or predominantly of polyorganosiloxanes. However, mixtures of polyorganosiloxanes with thermoplastic high polymers are not readily attainable because the polyorganosiloxanes are incompatible with or have but limited compatibility with most thermoplastic high polymers. It is, of course, possible to modify the basic composition of the polyorganosiloxane to enhance compatibility and alternatively or conjointly to limit its proportion to its compatibility range with the thermoplastic high polymer. But such enhancement is attainable at the expense of structural strength, stability or the water repellent characteristics of the final product. Desired electrical properties may be unattainable.

An actual copolymerization of silanes, silanols, or low molecular weight polyorganosiloxanes with a polymerizable monomer such as suggested by Roedel in U.S. Patent 2,420,911, or a chemical reaction of silane with a resin such as suggested by Barry in U.S. Patent 2,561,177 is inordinately expensive and still fails to provide a molding composition of the desired water repellency and electrical properties. On the other hand, a homogeneous mechanical mixture of the least complex and frequently the most water repellent polyorganosiloxanes like the dimethylpolysiloxane commercially sold as Silicone SE-76, with a thermoplastic high polymer of good electrical and structural properties like the styrene-butadiene copolymer commercially sold as Darex X-34 will exhibit the desirable properties of both components.

The primary objects of this invention are to provide convenient and inexpensive mixtures of polyorganosiloxanes and high molecular weight thermoplastic high polymers, and to provide a process for attaining such mechanical mixtures.

Another object of this invention is to obtain improved dielectric materials which have a low coefficient of friction with water, are permanently hydrophobic, and are readily molded.

An additional object resides in the provision of a dielectric material that will prevent "icing up."

A further object of this invention is to provide a moldable insulating composition comprising homogeneous, mechanically mixed polyorganosiloxane and a styrene-containing thermoplastic high polymer.

Yet another object of this invention is to provide compositions which are readily extruded.

The mechanical mixtures comprising the compositions of this invention are ordinarily attained by masticating or milling the thermoplastic high polymer in a Banbury type of mixer, and alternatively on a set of differential rolls, i.e., rolls travelling at different rates of speed, and then adding to it the polyorganosiloxane. It should, however, be understood that the invention is not limited to these particular blending operations, but rather to the special types of compositions and blending methods herein disclosed.

The limiting criteria of the mechanical mixtures or blends attainable in the practice of this invention are physical as distinguished from chemical. Thus usable polyorganosiloxanes have a unit structure

where R and R' are attached to any organic radicals through a C—Si bond with a ratio of R's to Si of from 1.98 to 2.00. Included, for example, are: dimethyl, methyl-ethyl, methyl-phenyl, ethyl-phenyl, methyl chlorophenyl, di-trichlorophenyl, di-phenoxyphenyl polysiloxanes, and others so long as the polyorganosiloxane is millable, fluxible or fusible at a temperature sufficient to flux the non-elastomeric thermoplastic. Because of their cost factors and their higher degree of water repellency, the polyorganosiloxanes enumerated above are preferred, but any usable substantially non-polymerizable, e.g., saturated, organo group attached through a carbon-silicon bond are specifically contemplated for the organo constituents of the polyorganosiloxane. Generally speaking, polyorganosiloxanes having weight average molecular weights falling the range of 100,000 to "infinite molecular weight" are satisfactory for the practice of this invention provided the degree of cross-linking which may be present in the highest molecular weight species is insufficient to cause infusibility of the polymer, and provided also that the lowest $\overline{M}_w$ species represents a narrow molecular weight distribution. Polyorganosiloxanes in this $\overline{M}_w$ range can be termed miscible. Polyorganosiloxanes of a weight average molecular weight ranging between 150,000 to 1,000,000 are preferred for the practice of this invention. Polyorganosiloxanes of molecular weight much below a weight average of 100,000 exude from the final mixture so rapidly as to interfere with molding operations.

Aside from the necessity of excluding and distinguishing polyorganosiloxanes from the sense in which the term "thermoplastic high polymer" is intended, the primary limitations on the high polymer are likewise physical. Thus, for example, the apparent weight average molecular weight should not be less than 5,000,000 as estimated by sedimentation-diffusion or some other applicable method. The expression "high polymer" as herein used is limited to materials having an apparent weight average molecular weight exceeding 5,000,000. The thermoplastic high polymers are cross-linked to form a retentive network for the polyorganosiloxane. At the same time, the average number of cross-links per primary molecule of the polymer must be limited so as not to prevent its fluxing with the polyorganosiloxane. It is well known in this art that in the early stages of cross-linking, a polymer is still substantially thermoplastic so that it can be processed with standard mixing equipment. The minimum degree of cross-linking necessary to bring about the onset of infinite network formation has been stated as about one cross-linkage for four polymer molecules—page 261 of Principles of Polymer Chemistry, Paul J. Flory, Cornell University Press, 1953. The maximum molecular weight thermoplastic material usable for the compositions of this invention depends on the molecular configuration of the completely gelled or cross-linked polymers having "infinite molecular weights," as referred to in the art, provided the degree of cross-linking is insufficient to interfere objectionably with fusion of the polymer in commonly employed mixing equipment. Generally speaking, the high polymers (and polyorganosiloxanes as well) usable for the practice of this invention should have the physical property of millability, fluxibility or fusibility; that is to say, the high polymers must be capable of mastication or milling in a Banbury mixer or on a pair of differential rollers of the type conventional in the rubber industry. Polymers of too high a degree of cross-linking cannot be properly milled; and further, the polyorganosiloxane cannot be properly dispersed into such materials. On the other hand, polymers too low in weight average molecular weight, even though in some instances which might be satisfactorily milled and mixed with the polyorganosiloxane, have too great a tendency to exude the polyorganosiloxanes, and as a result, products made from such mixtures are difficult to mold because the rapid exudation of polyorganosiloxane promotes poor welding. Moreover, products which are molded from the mixture rapidly lose their high degree of water repellency.

It is possible to introduce polyorganosiloxane into a base polymer of apparent weight average molecular weight ranging downwardly from 5,000,000 to about 150,000, but the resulting mixture is unsatisfactory.

Advantageously, the high polymer should have a hardness sufficient to provide the structural strength desired for the molded products formed from the composition. When mixtures of various thermoplastic materials are used to impart special properties to the final composition, it is only necessary that during blending the apparent weight average molecular weight fall in the specified range exceeding 5,000,000. Thus, by first preblending it with a lower molecular weight polymer, some thermoplastic high polymer having a high degree of cross-linking may be made part of the mixture.

Thermoplastic high polymers having an incipient cross-linked condition may be obtained in any of a number of ways. If in a polymerization, one of the reactive components is a diene, divinyl or other difunctional polymerizable monomer, either present, unregulated, in minute amount, or if in larger amount almost completely regulated, the result will be a cross-linked polymer with the cross-links being contributed by the difunctional monomer. Certain difunctional monomers such as divinyl benzene, divinyl adipate, and ethylene dimethacrylate are particularly active in this sense. It is not necessary that the cross-linking be built into the polymer initially. In some cases, a cross-linked graft copolymer can be prepared by treating a polymer of one type with a divinyl or diene monomer of a different type under conditions of polymerization.

The required cross-linking may be introduced into certain polymers by a so-called "prevulcanization" obtained by treating the polymer with a small amount of suitable curative. In diene rubbers the cross-linking agent or curative could be sulfur or a polymerization catalyst such as potassium persulfate; in polychloroprenes, polyacrylics, and chlorosulfonated polyethylene, the cross-linking agent could be an oxide of a bivalent metal such as magnesium oxide or litharge; and, in polymers containing hydroxyl groups, a bifunctional cross-linking agent such as a diisocyanate can be used.

Frequently it is desirable ultimately to produce a molded product which is insoluble and infusible, or nonmillable, or to put it more explicitly, has an infinite network formation far exceeding the point at which the high polymer is sufficiently thermoplastic to allow processing on standard mixing equipment. The mechanical mixtures of polyorganosiloxane and high polymers for producing such molded articles are themselves obtainable by using a special blending technique. Briefly, this technique comprises blending into a suitable base polymer, at normal blending temperatures, e.g. 100–200° F., the appropriate curing agents. Among the curing agents, however, is the minuscule quantity of accelerator needed to prevulcanize the base polymer to a state of incipient cross-linking. Once blending has been completed, the temperature is raised to precuring levels, e.g., 200–275° F., and maintained there long enough to effect the prevulcanization. The polyorganosiloxane can then be mixed into the resulting thermoplastic high polymer, before or after cooling to normal blending temperatures. Once the resulting mechanical mixture has been cooled to blending temperatures, any curatives necessary to complete vulcanization can be introduced, and the final composition cured to the desired state. For example the final composition may be extruded and cured on an electrical conductor to provide electrical insulation therefor.

In any event the requirement that there be a "thermoplastic high polymer" is basic to both the process and the compositions of the present invention. A striking example of this requirement can be found in the blending of a polyorganosiloxane into an isobutylene-isoprene copolymer (GR–I 17) having a weight average molecular weight substantially less than 500,000. 232 grams of the GR–I 17 are banded on a standard 6 inch x 12 inch, 2-roll rubber mill at a roll temperature of approximately 140° F. 11 grams of zinc oxide and 7 grams of stearic acid are added to the batch without causing lacing and crumbling. As soon as thorough mixing has taken place, an attempt is made to add a minute portion of dimethylpolysiloxane ($\overline{M}_w$ 600,000) to the batch. Even as small amount of the polyorganosiloxane as 1 gram causes the band to become lace-like and to crumble on the rolls; neither prolonged milling for 1½ hours nor raising the batch temperature to 220° F. serves to blend the polyorganosiloxane with the GR–I 17. However, if 4.7 grams of sulfur and 0.1 gram of benzothiazyl disulfide are added to the GR-I 17, zinc oxide, stearic acid mix, and the milling temperature raised to 220–240° F., the lace-like structure, persisting up to this point, disappears in about 5 minutes and the band becomes smooth and uniform. Any additional polyorganosiloxane in reasonable amount, e.g. 40 grams, can then be added to the mix as rapidly as any other plasticizing ingredient might. The sulfur plus a small amount of accelerator precures the stock to an apparent weight average molecular weight exceeding 5,000,000 thereby introducing a sufficient degree of crosslinking to form a retentive network for the polyorganosiloxane. The accelerators necessary to complete vulcanization are added later on cool rolls.

By selecting the polyorganosiloxane and the thermoplastic high polymer according to the above stated standards, the incompatability of the two components becomes relatively unimportant for the reason that the mixture looks and acts as though the two were compatible. Thus a molded product of the mixture appears to be of homogeneous composition. However, because a slight exudation of polyorganosiloxane to the surface of the molded article is desirable for maintaining a high level of water repellency over long periods of time, chemical incompatibility is preferred.

As previously indicated, the preferred embodiment of this invention is a homogeneous mechanical blend or mixture of thermoplastic high polymer and polyorganosiloxane for use as an electrical insulation. For this purpose the polymerization product of a vinyl aromatic hydrocarbon is preferred; more explicitly, a styrene-containing thermoplastic high polymer is preferred. Specifically, the preferred styrene-containing thermoplastic high polymers are polymers of styrene itself, monochlorostyrene, dichlorostyrene, trichlorostyrene, monofluorostyrene, difluorostyrene, trifluorostyrene, the methylstyrenes (vinyltoluene), and mixtures thereof. The styrene component may be accompanied by such other materials as butadiene or isobutylene in the form of a copolymer, or be in a terpolymer or a graft with a third component. Mixtures of a styrene-containing thermoplastic high polymer and one or more other thermoplastic high polymers may be used. The term "styrene-containing" thermoplastic high polymer as herein used contemplates within its sense all these variants.

Referring now to the accompanying drawing, the sole figure is a cross-section representing a preferred composition as it would normally be used to insulate an electrical conductor.

The permanently water repellent composition shown has of itself satisfactory structural rigidity and strength in addition to good electrical insulation characteristics. This composition comprises 15 weight parts of dimethylpolysiloxane (Silicone SE–76; $\overline{M}_w$ 600,000) and 85 weight parts of styrene-butadiene high polymer (Darex X–34). The exact composition may be somewhat varied. The dimethylpolysiloxane may vary from 15 to 30 weight parts and the styrene-butadiene high polymer from 85 to 70 weight parts without seriously detracting from the desirable properties of the preferred composition.

In providing a preferred embodiment of the invention, the final curing or vulcanization can occur as the composition is being molded or extruded to form insulation over the surface of an electrical conductor such as copper wire.

Suitable inorganic fillers like glass, asbestos, or the like may be used in the form of fine particles, fibers, mats or woven webs.

Considering the broader aspects of this invention, the ratio of thermoplastic high polymer to polyorganosiloxane in the mechanical mixture may vary as desired within the range of 50–99.5 percent by weight of thermoplastic high polymer to 50–½ percent by weight of polyorganosiloxane. One preferred range is 65% to 87.5% by weight thermoplastic high polymer to 35% to 12.5% by weight polyorganosiloxane. Or stating this preferred range in other terms, for every 7 parts by weight of thermoplastic high polymer, the addition of from 1 to about 3 parts by weight of polyorganosiloxane is contemplated. A second preferred range is 97% to 99% by weight thermoplastic high polymer to 3% to 1% by weight polyorganosiloxane. Although in each instance the preferred composition consists of, or at least essentially comprises the two materials, it is also within the contemplation of this invention to have a minor proportion of such other constituents as fillers and, or alternatively, curatives in the final composition.

For a better understanding of the invention, reference is made to the following examples.

*Example I*

977 grams of a suitable styrene-butadiene high polymer having a ratio of styrene to butadiene of 70 to 30 were fluxed in a type B Banbury mixer at a stock temperature of 325° and then 173 grams of dimethyl polysiloxane were added to the fluxed high polymer in four parts to facilitate incorporation of the polysiloxane into the mix. At the end of 15 minutes, total mixing time, the blend was dumped on to a 2-roll mill at a temperature of 300° F. and sheeted off. The sheet was cut into strips for feeding to a granulator. The granules were ready for injection molding. Molded test slabs of this composition were compared with slabs of a similar control composition in which the polysiloxane was replaced by an equal weight of GR–S 1503, a common butadiene-styrene rubber. While the material containing the polysiloxane was somewhat stronger and stiffer than the control stock the difference in mechanical properties was not marked. However, the stock containing the polysiloxane exhibited a high degree of water repellency (as measured by electrical surface resistance of test specimens 20 sec. after wetting in an inclined position) even after six months natural outdoor weathering, while the control stock which contained no polysiloxane lost its water repellency and high surface resistance after one month of outdoor exposure. Furthermore, the stock containing the polysiloxane retained its water repellency and high surface resistance even while it had collected a substantial coating of dirt during weathering.

Results showing the comparative effects of the polysiloxane and GR–S on mechanical and electrical properties are given below. Teflon fluorocarbon is used as a control.

| Composition | C-662 | C-722 | Teflon |
|---|---|---|---|
| Butadiene-styrene rubber (GR-S 1503)[1] | 15 | | |
| Styrene-butadiene high polymer (Darex X–34)[2] | 85 | 85 | |
| Dimethlypolysiloxane (Silicone SE–76) | | 15 | |
| Polytetrafluoroethylene | | | 100 |
| Properties, initial: | | | |
| Tensile strength, p.s.i. | 1,870 | 2,050 | 1,580 |
| Ultimate elongation, percent | 3.3 | 1.9 | [3] NB |
| Modulus of Elasticity, tension, p.s.i.×10⁵ | 1.43 | 1.32 | 0.46 |
| Dielectric Constant, 1.0 mc | 2.58 | 2.62 | 2.06 |
| Loss Factor, 1.0 mc | 0.007 | 0.006 | 0.0006 |
| Surface resistance, wet, megohms | 5×10⁶ | 5×10⁶ | 5×10⁶ |
| Properties, 6 months outdoor weathered: | | | |
| Tensile strength, p.s.i. | | 1,940 | 1,880 |
| Ultimate Elongation, percent | | 2.7 | [3] NB |
| Modulus of Elasticity, Tension, p.s.i.×10⁵ | | 1.10 | 0.33 |
| Dielectric Constant, 1.0 mc | | 2.68 | |
| Loss Factor, 1.0 mc | | 0.009 | |
| Surface Resistance, wet and dirty, megohms | | 0.7 | 7×10⁵ | 1.4 |

[1] GR–S 1503 is a copolymer of butadiene and styrene with 23.5% styrene.
[2] Darex X–34 is a high styrene rubber resin of 85% styrene.
[3] NB means no break.

*Example II*

862 grams of a styrene-divinylbenzene copolymer having approximately 0.1% of divinylbenzene were fluxed in a type B Banbury mixer at a stock temperature of about 325° F. and then 288 grams of dimethylpolysiloxane were added to the fluxed high polymer in several parts to facilitate incorporation of the polysiloxane into the mix. At the end of 15 minutes, total mixing time, the blend was dumped on a 2-roll mill at a temperature of 300° F. and sheeted off. Pieces were cut to approximate size and molded in a compression mold at 315° F. for 15 minutes. The molded test slabs of this composition were compared with control slabs of a similar composition in which the styrene-divinylbenzene copolymer was replaced by a heat resistant, toluene soluble polystyrene, which was not cross-linked.

Results showing the effect of 15% and 25% respectively of the polysiloxane on the styrene-divinylbenzene copolymer and on the polystyrene are shown below. It will be seen that while increase of silicone content improves the distensibility of the styrene-divinyl copolymer, the same increase in silicone content shortens or embrittles the polystyrene.

| Composition | C-837 | C-846 | C-845 | C-847 |
|---|---|---|---|---|
| Styrene-divinylbenzene copolymer | 85 | | 75 | |
| Polystyrene, Koppers 8X | | 85 | | 75 |
| Dimethylpolysiloxane, Silicone SE-76 | 15 | 15 | 25 | 25 |
| Properties: | | | | |
| Flexural Strength, p.s.i. | 5,600 | 5,150 | 4,530 | 3,740 |
| Tan. Proportional Limit, p.s.i. | 3,720 | 2,710 | 2,420 | 1,640 |
| Yield Strength, p.s.i. | 4,980 | 3,730 | 3,420 | 2,470 |
| Modulus of Elasticity, flexure, p.s.i.×10⁵ | 338,600 | 347,000 | 278,000 | 330,000 |
| Deformation at break [1] | 7.5 | >19.0 | 16.7 | 12.8 |

[1] As percent of span length.

*Example III*

510 grams of a high styrene copolymer characterized by having a Shore D hardness of 85, and by being commercially obtainable as Pliotuf G85C (a styrene-butadiene copolymer with high styrene content) were fluxed on a 2-roll mill at a roll temperature of 300° F. and when the high polymer was properly banded, 90 grams of dimethyl polysiloxane were added to the mix, gradually, in small pellets. After 15 to 20 minutes mixing, the two components appeared uniformly blended, and then the stock was sheeted off the rolls at the required thickness for molding. Test slabs were molded at 315° for 15 minutes and cooled to remove. The molded slabs appeared dry on the surface and exhibited a high degree of water repellency. The above commercial copolymer is a cross-linked product as demonstrated by its tendency to disperse but not dissolve, molecularly speaking, in a suitable solvent such as toluene.

Composition: C-868
High styrene copolymer, Pliotuf G85C [1] ____ 85
Dimethyl polysiloxane ____ 15
Properties, initial:
  Tensile strength, p.s.i. ____ 2290
  Ultimate elongation, percent ____ 1.65
  Modulus of elasticity, tension, p.s.i. ×10⁵ ____ 2.10
  Dielectric constant, 1.0 mc. ____ 2.57
  Loss factor, 1 mc. ____ 0.0018
  Water absorption, percent:
    24 hours at 73° F. ____ 0.158
    48 hours at 73° F. ____ 0.220
    168 hours at 73° F. ____ 0.420
  Surface resistance, wet, megohms ____ 5×10⁶

[1] Purified by extraction with a 50/50 volume mixture of acetone and water and agglomerated with acetone.

*Example IV*

420 grams of an incipiently cross-linked synthetic rubber, commercially obtainable as GR-S 1018,* which is a terpolymer of butadiene, styrene and divinyl benzene, were banded on a 2-roll mill having an initial roll temperature of 160° F. To this stock was added 180 grams of dimethyl polysiloxane (SE-76) gradually, in small pellets. After 15 to 20 minutes mixing the stock appeared to be uniformly blended. It was convenient then to introduce curatives into the compound in accordance with the following formulation:

Rubber/polysiloxane blend, 70/30 ____ 100
HAF black ____ 30
Sulfur ____ 2.5
Tetramethylthiuramdisulfide ____ 0.50
Benzothiazyldisulfide ____ 1.0

Cross-linked butadiene-acrylonitrile rubber may be substituted for the cross-linked butadiene styrene divinyl benzene rubber in the above example.

*Example V*

Using the same conditions as in Example IV a similar composition was prepared in which GR-S 1019,** a butadiene-styrene copolymer was substituted for GR-S 1018. The GR-S 1019 possessed a substantial cross-linked structure and was able to blend with the polysiloxane.

The compositions of Examples IV and V were cured for 20 minutes at 310° F. Over a long period of storage both cured stocks exhibited a dry bloom, but did not become wet and greasy. It was concluded that such stocks would find usefulness as water and ice repellent compositions.

*Example VI*

510 grams of an incipiently cross-linked styrene copolymer commercially obtainable as Darex X-34 were fluxed on a 2-roll mill at a roll temperature of 300° F. and when the resin was properly banded, 90 grams of methyl phenyl polysiloxane ($\overline{M}_w$ 500,000) were added to the mix gradually, in small pellets. After 15 to 20 minutes, total mixing time, the two components appeared uniformly blended. The stock was then sheeted off the rolls and pieces were cut for molding in a slab mold. A test slab was molded at 325° F. for 10 minutes, at the end of which time the mold was cooled for removal of the slab. The test slab exhibited properties closely approximating those of the composition of Example I, although in this latter example, the methyl phenyl derivative was used instead of the dimethyl polysiloxane.

Test results are shown below.

| Composition | C-855 | C-861 |
|---|---|---|
| Methylphenylpolysiloxane, Silicone SE-51 | 15 | 15 |
| Styrene-butadiene copolymer, Darex X-34 | 85 | |
| Styrene-butadiene copolymer, Darex X-34 [1] | | 85 |
| Properties, initial: | | |
| Dielectric Constant, 1 mc | 2.60 | 2.62 |
| Loss Factor, 1 mc | 0.0048 | 0.0071 |
| Water Absorption, Percent— | | |
| 24 hours, 73° F | 0.204 | 0.141 |
| 48 hours, 73° F | 0.283 | 0.183 |
| 168 hours, 73° F | 0.531 | 0.316 |

[1] Prepared by diluting the latex with distilled water and coagulating with acetone.

An acrylic terpolymer comprising a 70/20/10 ratio of ethylhexyl acrylate/butadiene/acrylonitrile was polymerized with a minimum of modifier so that considerable cross-linking occurred during the polymerization. This cross-linked terpolymer was compounded on a cool 2-roll mill with zinc oxide, stearic acid, benzothiazyl disulfide, sulfur, and HAF black in accordance with the recipe given below, and to this compound was added 10 percent by weight of dimethyl polysiloxane with the aid of the cool 2-roll mill.

* GR-S 1018 is a copolymer of butadiene and styrene cross-likned with divinyl benzene, having 23.5% styrene.

** GR-S 1019 is a copolymer of butadiene and styrene having 23.5% styrene.

| | |
|---|---:|
| 2-ethylhexyl acrylate/butadiene/acrylonitrile, 70/20/10 | 100 |
| Zinc oxide | 5 |
| Stearic acid | 1 |
| HAF black | 50 |
| Benzothiazyl disulfide | 1 |
| Sulfur | 1.5 |
| Dimethyl polysiloxane (Silicone SE-76) | 15.9 |

The stock was cured on a 6" x 6" x .075" sandwich mold at 310° F. for 30 minutes. The cured stock released readily from the mold, and after cooling exhibited a high degree of water repellency as indicated by the high contact angle of droplets of water on its surface. However, no thick coating of polysiloxane indicative of phase separation was evident.

*Example VIII*

203 grams of a chlorosulfonated polyethylene, Hypalon S-2, was compounded on a 140° F. 2-roll mill with 41 grams of magnesium oxide and 20 grams of dipentamethylene thiuram tetrasulfide. As soon as the ingredients were thoroughly mixed the stock temperature was raised to 200° F. for five minutes to precure the stock. At the end of this time, the stock was removed from the rolls and allowed to cool. The rolls were cooled to 140° F. and the cool stock rebanded on the rolls. It was then possible to add 36 grams of dimethyl polysiloxane (Silicone SE-76) to the batch without delay. The compounded stock was cured in a 6" x 6" x 0.075" sandwich mold at 310° F. for 30 minutes. The cured stock was very elastic with exceptional snap. While the polysiloxane produced a water repellent surface on the cured stock, it did not bleed out and make the surface wet and sticky.

*Example IX*

232 grams of isobutylene-isoprene copolymer (GR-I 17) was mixed on a cold 2-roll mill with 7 grams of stearic acid, 11.6 grams of zinc oxide, 4.65 grams of sulfur and 0.1 grams of benzothiazyl disulfide. The temperature of the rolls was raised to 230° F. and the rolls were tightened. The stock was milled on the tight rolls for about 10 minutes or until a uniform thin band was obtained. 41 grams of dimethyl (SE-76) polysiloxane were then added fairly rapidly to the batch and blended in. As soon as blending was completed and the stock appeared uniform, it was removed from the rolls and cooled. The cooled stock was placed on rolls at 140° F. and 1.1 grams of benzothiazyl disulfide and 2.3 grams of tetramethyl thiuram disulfide were added to the batch and thoroughly mixed. The compounded stock was cured for 30 minutes at 310° F. in a 6" x 6" x 0.075" sandwich mold. The cured stock was very elastic and exhibited no objectionable bloom of polysiloxane. The rapidity with which the dimethyl polysiloxane could be added to the precured GR-I stock indicated that much larger amounts of polysiloxane can be tolerated if desired as a low temperature plasticizer.

*Example X*

The following tabulation illustrates compositions containing a lower quantity of polyorganosiloxanes ranging from ½–5%.

| | C-995 | C-996 | C-998 | C-1027 | C-1049 | Control |
|---|---|---|---|---|---|---|
| Styrene-butadiene resin [1] | 61.8 | 64.35 | 95.0 | | | |
| Styrene-butadiene resin [2] | 33.2 | 34.65 | | | | |
| Styrene-butadiene resin [3] | | | | | | 100 |
| Rubber modified styrene-resin [4] | | | | 98.0 | 95.0 | |
| Purified dimethyl silicone gum [5] | 5.0 | 1.0 | 5.0 | | | |
| Purified dimethyl silicone gum [6] | | | | 2.0 | 5.0 | |
| Surface Resistance, megohms: | | | | | | |
| 1. Initially | 5×10⁶ | 5×10⁶ | 5×10⁶ | 5×10⁶ | 5×10⁶ | 5×10⁶ |
| 2. After 2 mos. outdoor weathering | 2×10⁶ | 4×10⁵ | 2×10⁵ | 5×10⁶ | 5×10⁶ | 3.5 |
| 3. After 4 mos. outdoor weathering | 2×10⁶ | 35 | 550 | 5×10⁶ | 5×10⁶ | 1.8 |

[1] Plio-tuf G-75C, purified by acetone/H²O extraction, Goodyear.
[2] Plio-tuf G-85C, purified by acetone/H²O extraction, Goodyear.
[3] Darex X-34, Dewey & Almy.
[4] TML 5151, Bakelite.
[5] Silicone SE-30, General Electric.
[6] Silicone W-96, Linde.

Values of electrical D.C. surface resistance in megohms both initially and after periods of outdoor weathering sufficient to result in the accumulation of surface grime and dirt on the test specimens are shown. It will be noted that when these dirty specimens are wet by immersing in water and then tested for surface resistance, the compositions containing silicone gum exhibit a much higher surface resistance than the control stock. This is interpreted as indicating that the silicone in the silicone bearing compositions migrates to the surface of the test specimens and coats the dirt collected thereon. This coating makes the dirt water repellent or hydrophobic while the dirt on the control composition (containing no silicone) remains hydrophilic.

It should be noted that the weathering characteristics of the compositions containing the lowest percentage of polyorganosiloxane are still better than the control. However, these ½–5% polyorganosiloxanes are best suited to uses in which severe weathering is not encountered, e.g. indoor applications.

Besides the water repellency feature, low percentages, e.g. ½–5%, preferably 1–3% polyorganosiloxane, impart to the thermoplastic high polymer a degree of lubricity which greatly facilitate molding operations such as extrusion.

Thus, for example, a refrigerator white composition has been prepared by incorporating suitable pigments in composition C-1027. This new composition, C-1091, has been tested both as a compression and injection molding stock and has been judged to be equal to or better than high impact styrene resins in the physical properties tested. It is definitely superior to the high impact styrenes in extruded finish and substantially superior in installation fatigue resistance and probably superior in flex fatigue resistance. C-1091 is equal to ethyl cellulose refrigerator white stocks in extruded finish and installation fatigue, at least equal in flex fatigue resistance and impact strength, far superior in dimensional stability, lower in cost and equal to ethyl cellulose in other properties. This judgment was based upon stocks extruded as refrigerator breaker strip. For applications of this type installation fatigue, i.e., breakage during installation or as a result thereof, is an important consideration. The dies used for the extrusion was one designed for regular polyethylene and was used, unsuccessfully, in an effort to extrude Koppers Super-Dylan, a high impact styrene resin similar in properties to the styrene resin in composition C-1027.

The following is a tabulation of the physical properties of the type of C-1027 and a suitable control.

Example XI

|  | C-1027 | C-1013 | Control |
|---|---|---|---|
| Rubber modified styrene resin,[1] percent | 98.0 | 95.0 | 100 |
| Dimethyl silicone gum,[2] percent | 2.0 | 5.0 | -------- |
| Tensile Strength: | | | |
| Initial, p.s.i | 3,750 | 3,560 | 4,550 |
| After 100 hrs., p.s.i | 3,740 | 3,470 | 4,410 |
| Change, percent | −0.3 | −2.5 | −5.3 |
| Elongation: | | | |
| Initial, percent | 39 | 47 | 41 |
| After 100 hrs., percent | 14 | 13 | 4 |
| Change, percent | −64 | −73 | −90 |
| Notched Izod, 1/8"/23° C.: | | | |
| Initial, f.p.p.i | 4.15 | 3.47 | 3.09 |
| After 100 hrs., f.p.p.i | 3.28 | 2.75 | 2.64 |
| Change, percent | −21 | −21 | −15 |
| Notched Izod, 1/8"/0° C.: | | | |
| Initial, f.p.p.i | 1.90 | 1.78 | 1.55 |
| After 100 hrs., f.p.p.i | 2.05 | 1.72 | 1.28 |
| Change | +8 | −3 | −17 |

[1] TMD-5151, Bakelite.
[2] Silicone W-96, Linde.

These data were obtained upon injection molded specimens. It will be noted that the addition of silicone gum to the compositions improves both elongation and impact strength, both initially and after 100 hours' exposure to an X1A ultraviolet exposure unit, e.g. Fadeometer.

Having thus described my invention, what I claim as novel and desire to secure by Letters Patent of the United States is:

1. A water repellent composition comprising a homogeneous mechanical mixture obtained by milling together:
    (1) a fusible cross-linked thermoplastic polymerization product of ethylenically unsaturated monomers having a weight average molecular weight exceeding 5,000,000 measured by sedimentation-diffusion techniques, the polymerization product being a styrene-butadiene copolymer, and
    (2) a millable polyorganosiloxane gum which is polydimethyl siloxane gum, said polyorganosiloxane having a weight average molecular weight exceeding 150,000, the components of said mixture being in a weight ratio range from between 50 and 99.5 parts of the thermoplastic polymerization product to between about 50 and ½ parts of the polyorganosiloxane.

2. A water repellent composition comprising a homogeneous mechanical mixture obtained by milling together:
    (1) a fusible cross-linked thermoplastic polymerization product of ethylenically unsaturated monomers having a weight average molecular weight exceeding 5,000,000 measured by sedimentation-diffusion techniques, the polymerization product being a styrene-butadiene copolymer, and
    (2) a millable polyorganosiloxane gum which is polymethylphenyl siloxane gum, said polyorganosiloxane having a weight average molecular weight exceeding 150,000, the components of said mixture being in a weight ratio range from between 50 and 99.5 parts of the thermoplastic polymerization product to between about 50 and ½ parts of the polyorganosiloxane.

References Cited in the file of this patent

UNITED STATES PATENTS

| | | |
|---|---|---|
| 2,155,590 | Garvey | Apr. 25, 1939 |
| 2,258,218 | Rochow | Oct. 7, 1941 |
| 2,356,128 | Thomas et al. | Aug. 22, 1944 |
| 2,442,059 | Safford | May 25, 1948 |
| 2,494,329 | Carlin | Jan. 10, 1950 |
| 2,806,256 | Smith-Johannsen | Sept. 17, 1957 |

FOREIGN PATENTS

| | | |
|---|---|---|
| 673,962 | Great Britain | June 18, 1952 |

OTHER REFERENCES

Bawn: "The Chemistry of High Polymers," page 20, published 1948, by Interscience Publishers, New York.

Schmidt-Marlies: "Principles of High-Polymer Theory and Practice," page 237, published by McGraw-Hill, New York, 1948.

Meyer: "Natural and Synthetic High Polymers," pages 22–27, 2nd edition (1950), Interscience, New York.

Hill: "Fibres From Synthetic Polymers," pages 209–210 (1953), Elsevier, New York.